United States Patent
Huang

(10) Patent No.: US 9,377,676 B2
(45) Date of Patent: Jun. 28, 2016

(54) AUTOSTEREOSCOPIC DISPLAY DEVICE

(71) Applicant: DELTA ELECTRONICS, INC., Taoyuan Hsien (TW)

(72) Inventor: June-Jei Huang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 266 days.

(21) Appl. No.: 14/296,825

(22) Filed: Jun. 5, 2014

(65) Prior Publication Data

US 2015/0268546 A1 Sep. 24, 2015

(30) Foreign Application Priority Data

Mar. 24, 2014 (TW) .............................. 103110800 A

(51) Int. Cl.
| | |
|---|---|
| *G02F 1/1335* | (2006.01) |
| *G03B 21/20* | (2006.01) |
| *G02B 27/22* | (2006.01) |
| *G02B 27/26* | (2006.01) |
| *G03B 21/10* | (2006.01) |

(Continued)

(52) U.S. Cl.
CPC .......... *G03B 21/2073* (2013.01); *G02B 27/225* (2013.01); *G02B 27/26* (2013.01); *G03B 21/10* (2013.01); *G03B 35/26* (2013.01); *G03B 21/625* (2013.01)

(58) Field of Classification Search
CPC .... G02B 27/26; G02B 27/225; G02B 27/286; G02B 27/283; G03B 21/2073; G03B 21/10; H04N 13/0402
See application file for complete search history.

(56) References Cited

U.S. PATENT DOCUMENTS

| | | | |
|---|---|---|---|
| 7,894,419 B2 | 2/2011 | Turpin et al. | |
| 7,944,465 B2 | 5/2011 | Goulanian et al. | |
| 8,220,934 B2 * | 7/2012 | Schuck ................ | G02B 27/26 353/10 |

(Continued)

FOREIGN PATENT DOCUMENTS

| | | |
|---|---|---|
| TW | 201317636 | 5/2013 |
| TW | 201335626 | 9/2013 |

OTHER PUBLICATIONS

T. Kanebako and Y. Takaki, "Time-multiplexing display module for high-density directional display," in Stereoscopic Displays and Applications XIX, A. Woods, N. Holliman, and J. Merritt, eds., Proc. SPIE-IS&T Electronic Imaging 6803, 68030P (2008).

(Continued)

*Primary Examiner* — Thanh-Nhan P Nguyen
(74) *Attorney, Agent, or Firm* — Hauptman Ham, LLP

(57) ABSTRACT

An autostereoscopic display device includes a projector, an angle-enlarging module, a screen, and a polarization selector. The projector provides a lamp image unit with a first polarization state. The angle-enlarging module includes a deflecting plate, a wavelength retarder, and a polarizer. The deflecting plate has a first deflecting segment and a second deflecting segment alternately with each other. The first and the second deflecting segments respectively deflect the lamp image unit to a first direction and a second direction different from each other. The wavelength retarder has a transmitting segment aligned to the first deflecting segment and a wavelength retarding segment aligned to the second deflecting segment. The transmitting segment maintains the first polarization state when the lamp image unit passes therethrough. The wavelength retarding segment converts the first polarization state into a second polarization state. The polarization selector is disposed between the projector and the angle-enlarging module.

10 Claims, 6 Drawing Sheets

(51) Int. Cl.
*G03B 35/26* (2006.01)
*G03B 21/625* (2014.01)

(56) References Cited

U.S. PATENT DOCUMENTS

2007/0070476 A1    3/2007   Yamada et al.
2009/0096991 A1*   4/2009   Chien .................. G02B 27/26
                                                    353/8

OTHER PUBLICATIONS

Lawrence Bogaert, Youri Meuret, Stijn Roelandt, Aykut Avci, Herbert De Smet, and Hugo Thienpont, "Demonstration of a multiview projection display using decentered microlens arrays", Optics Express 26106, vol. 18, No. 25 (2010).

Takahiro Ishinabe, Tohru Kawakami and Tatsuo Uchida, "High-Resolution Floating Autostereoscopic 3D Display Based on Iris-Plane-Dividing Technology", SID Int. Symp. Digest Tech. Papers 17.5, pp. 225-228 (2012).

* cited by examiner

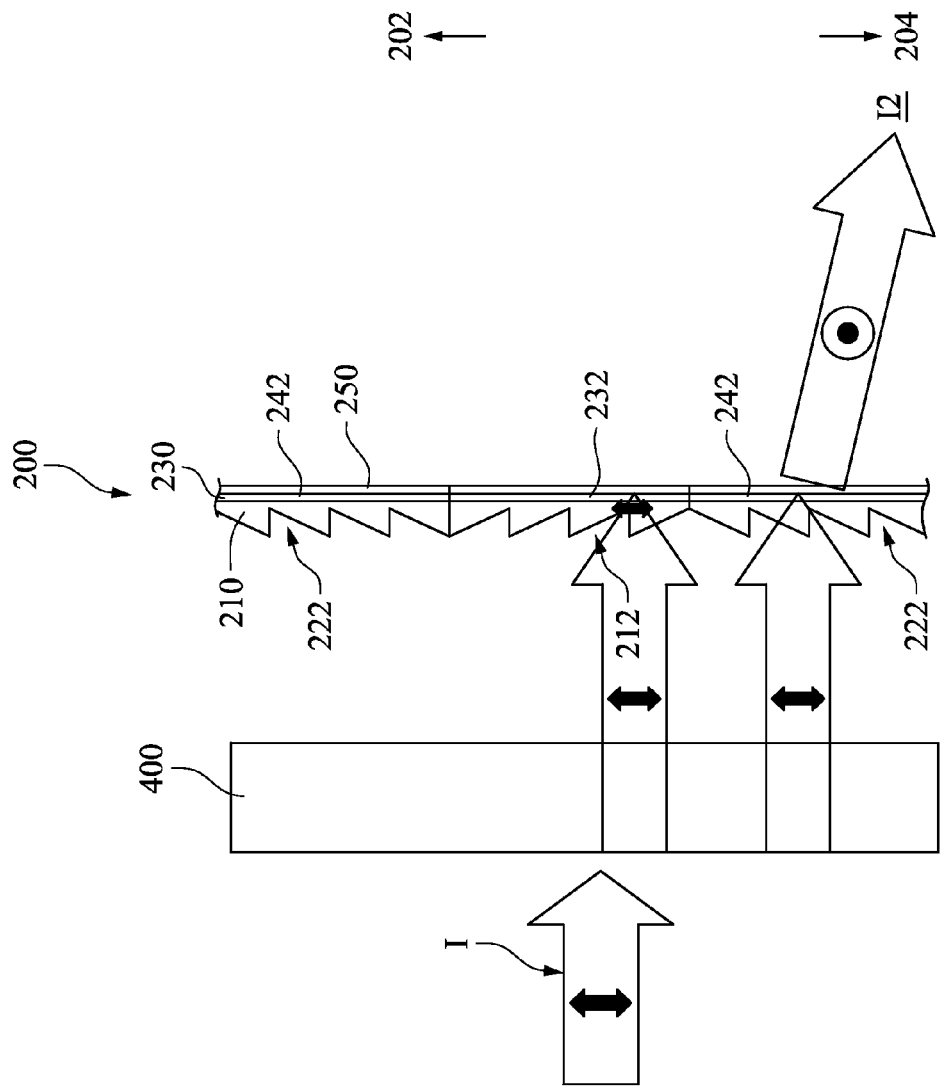

AUTOSTEREOSCOPIC DISPLAY DEVICE

RELATED APPLICATIONS

This application claims priority to Taiwan Application Serial Number 103110800, filed Mar. 24, 2014, which is herein incorporated by reference.

BACKGROUND

1. Field of Invention

The present invention relates to an autostereoscopic display device.

2. Description of Related Art

Exploiting the binocular parallax of humans, a stereoscopic display enables an observer to experience a stereoscopic image by providing two different images respectively to two eyes of the observer. An autostereoscopic display, unlike other kinds of stereoscopic displays which require special glasses to distinguish left-eye and right-eye images, provides a plurality of images from a plurality of light sources, in which the respective images are projected to different spatial positions. Two eyes of an observer can receive different images corresponding to any two of the spatial positions respectively so that the observer perceives a stereoscopic image. Autostereoscopic display technology avoids the inconvenience of wearing glasses necessary in stereoscopic display technology, and has become an area of the most interested developments in recent times.

SUMMARY

An aspect of the present invention is to provide an autostereoscopic display device including at least one projector, an angle-enlarging module, a screen, and a polarization selector. The projector is configured to provide a lamp image unit with a first polarization state. The angle-enlarging module includes a deflecting plate, a wavelength retarder, and a polarizer. The deflecting plate has at least one first deflecting segment and at least one second deflecting segment alternately disposed with each other. The first deflecting segment is configured to deflect the lamp image unit to a first direction, and the second deflecting segment is configured to deflect the lamp image unit to a second direction. The first direction is different from the second direction. The wavelength retarder has at least one transmitting segment and at least one wavelength retarding segment. The transmitting segment is aligned to the first deflecting segment, and the wavelength retarding segment is aligned to the second deflecting segment. The transmitting segment allows the lamp image unit to pass therethrough and maintains the first polarization state, and the wavelength retarding segment converts the first polarization state of the lamp image unit into a second polarization state. The wavelength retarder is disposed between the deflecting plate and the polarizer. The angle-enlarging module is disposed between the projector and the screen. The polarization selector is disposed between the projector and the angle-enlarging module. In a first time period, the polarization selector converts the first polarization state of the lamp image unit into the second polarization state. The lamp image unit then passes through the angle-enlarging module, is deflected to the first direction, and is incident the screen. In a second time period, the lamp image unit maintains the first polarization state after passing through the polarization selector. The lamp image unit then enters the angle-enlarging module, is deflected to the second direction by the angle-enlarging module, and is incident the screen.

In one or more embodiments, the deflecting plate includes a plurality of first deflecting elements and a plurality of second deflecting elements. The first deflecting elements are disposed in the first deflecting segment, and the second deflecting elements are disposed in the second deflecting segment. Each of the first deflecting elements has a first light incident surface, and each of the second deflecting elements has a second light incident surface different from the first light incident surface.

In one or more embodiments, the deflecting plate has a normal surface passes between the first deflecting segment and the second deflecting segment adjacent to each other. The first light incident surfaces and the second light incident surfaces are symmetric with respect to the normal surface.

In one or more embodiments, cross-sectional surfaces of the first deflecting elements and cross-sectional surfaces the second deflecting elements are zigzag-shaped.

In one or more embodiments, the polarizer allows the lamp image unit with the second polarization state to pass therethrough, and blocks the lamp image unit with the first polarization state.

In one or more embodiments, the screen includes a first lens array and a second lens array. The first lens array has a surface away from the second lens array. The lamp image unit forms a plurality of pixels on the surface. Each of the pixels overlap at least a portion of a projection of the first deflecting segment on the surface and at least a portion of a projection of the second deflecting segment on the surface.

In one or more embodiments, the pixels are arranged at least along an arrangement direction, each of the projection of the first deflecting segment of the deflecting plate and the projection of the second deflecting segment of the deflecting plate have an extending direction, the extending direction and the arrangement direction form an angle about 45 degrees.

In one or more embodiments, the autostereoscopic display device further includes a collimating lens disposed between the angle-enlarging module and the screen.

In one or more embodiments, the polarization selector is a liquid crystal panel.

In one or more embodiments, the screen includes a first lens array and a second lens array. The first lens array is disposed facing the angle-enlarging module, and is disposed between the angle-enlarging module and the second lens array.

BRIEF DESCRIPTION OF THE DRAWINGS

FIG. 4 is an optical schematic diagram of the polarization selector and the angle-enlarging module of FIG. 1 in the second time period;

DETAILED DESCRIPTION

Figure 1:
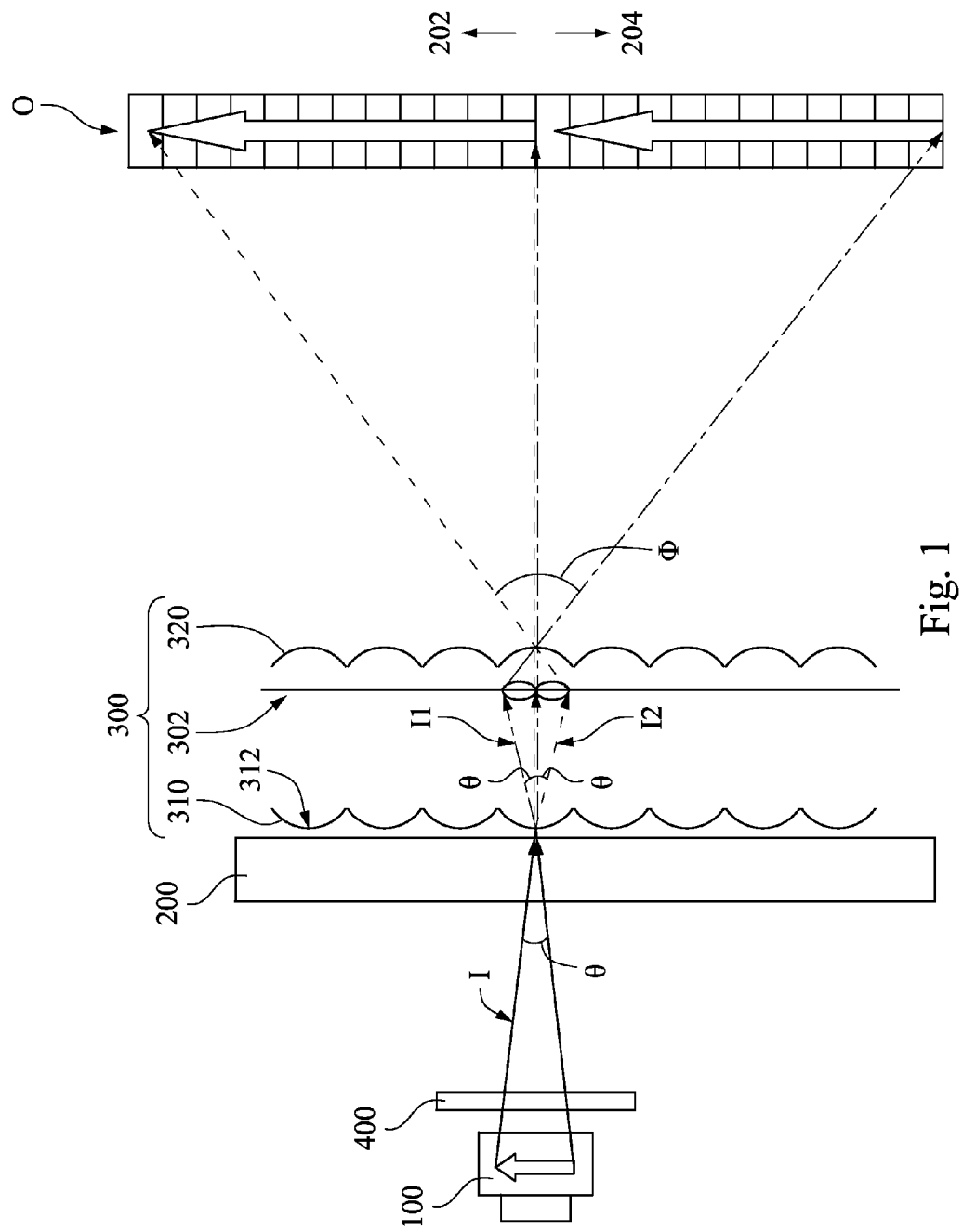
FIG. 1 is a top view of an autostereoscopic display device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a top view of an autostereoscopic display device according to one embodiment of the present invention. The autostereoscopic display device includes at least one projector 100, an angle-enlarging module 200, a screen 300, and a polarization selector 400. The projector 100 is configured to provide a lamp image unit I with a first polarization state. The lamp image unit I includes a plurality of lamp images with different views. The angle-enlarging module 200 is disposed between the projector 100 and the screen 300. The polarization selector 400 is disposed between the projector 100 and the angle-enlarging module 200. In a first time period, the polarization selector 400 converts the first polarization state of the lamp image unit I into the second polarization state. The lamp image unit I then passes through the angle-enlarging module 200, is deflected to the first direction 202, becomes a lamp image unit I1, and is incident the screen 300. In a second time period, the lamp image unit I maintains the first polarization state after passing through the polarization selector 400. The lamp image unit I then enters the angle-enlarging module 200, is deflected to the second direction 204 by the angle-enlarging module 200, becomes a lamp image unit I2, and is incident the screen 300. The first direction 202 is different from the second direction 204.

The autostereoscopic display device of the present embodiment provides the lamp image units I1 and I2 that have enough amount of views of the lamp images, and prevents the lamp image units I1 and I2 from forming Airy disk on a lamp image cofocal plane 302 of the screen 300, which may affect the resolution of the lamp images on an observing plane. More specifically, in this embodiment, the lamp image unit I provided by the projector 100 has a projection angle θ. If the projection angle θ is too small, the number of the lamp images of the lamp image unit I is limited to prevent the lamp image unit I from forming the Airy disk on the lamp image cofocal plane 302. In this embodiment, however, the angle-enlarging module 200 deflects the lamp image unit I toward the first direction 202 in the first time period so as to generate the lamp image unit I1, and deflects the lamp image unit I toward the second direction 204 in the second time period so as to generate the lamp image unit I2. Therefore, the lamp image units I1 and I2 together have a projection angle 2θ after the lamp image unit I passes through the angle-enlarging module 200. In other words, the projection angle is enlarged, such that the lamp image units I1 and I2 entering the screen 300 can form a larger projection angle 2θ to avoid Airy disk, and the number of the lamp images provided by the lamp image units I1 and I2 together is twice the number of the lamp images provided by the lamp image unit I.

Figure 2:
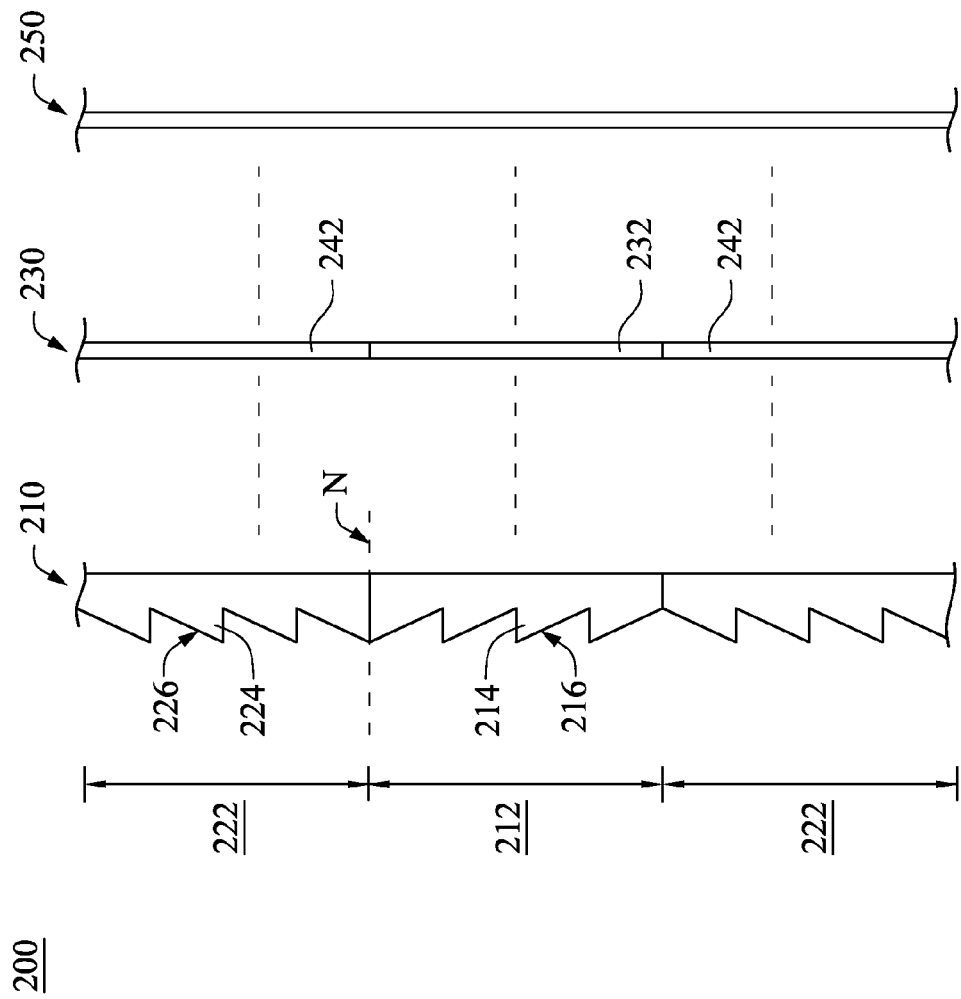
FIG. 2 is an enlarged exploded view of an angle-enlarging module of FIG. 1.

FIG. 2 is an enlarged exploded view of the angle-enlarging module 200 of FIG. 1. Reference is made to FIGS. 1 and 2. The angle-enlarging module 200 includes a deflecting plate 210, a wavelength retarder 230, and a polarizer 250. The deflecting plate 210 has at least one first deflecting segment 212 and at least one second deflecting segment 222 alternately disposed with each other. The first deflecting segment 212 is configured to deflect the lamp image unit I to the first direction 202, and the second deflecting segment 222 is configured to deflect the lamp image unit I to the second direction 204. The wavelength retarder 230 has at least one transmitting segment 232 and at least one wavelength retarding segment 242. The transmitting segment 232 is aligned to the first deflecting segment 212, and the wavelength retarding segment 242 is aligned to the second deflecting segment 222. The transmitting segment 232 allows the lamp image unit I to pass therethrough and maintains the first polarization state, and the wavelength retarding segment 242 converts the first polarization state of the lamp image unit I into the second polarization state. The wavelength retarder 242, such as a half-wave retarder, is disposed between the deflecting plate 210 and the polarizer 250.

In greater detail, reference is made to FIG. 2. In this embodiment, the deflecting plate 210 can include a plurality of first deflecting elements 214 and a plurality of second deflecting elements 224. The first deflecting elements 214 are disposed in the first deflecting segment 212, and the second deflecting elements 224 are disposed in the second deflecting segment 222. Each of the first deflecting elements 214 has a first light incident surface 216, and each of the second deflecting elements 224 has a second light incident surface 226 different from the first light incident surface 216. More specifically, both of the first deflecting elements 214 and the second deflecting elements 224 can be strip-shaped, and cross-sectional surfaces of the first deflecting elements 214 and the second deflecting elements 224, which are shown in FIG. 2, can be zigzag-shaped. The first light incident surface 216 and the second light incident surface 226 are both the inclined surface of the zigzags. In other words, the lamp image unit I of FIG. 1 is incident the first light incident surface 216 and the second light incident surface 226 obliquely, such that the propagation direction of the lamp image unit I can be deflected. Furthermore, since the first light incident surface 216 is different from the second light incident surface 226, the propagation direction of the lamp image unit I incident the first light incident surface 216 is different from that of the lamp image unit I incident the second light incident surface 226.

In one or more embodiments, the deflecting plate 210 has a normal surface N passing between the first deflecting segment 212 and the second deflecting segment 222 adjacent to each other. The first light incident surfaces 216 and the second light incident surfaces 226 are symmetric with respect to the normal surface N. That is, the lamp image unit I (see FIG. 1) passing through the first light incident surface 216 and the lamp image unit I passing through the second light incident surface 226 are deflected to opposite directions but at the same deflecting angle. Furthermore, the deflecting angle of the lamp image unit I can be (1/2)θ, such that an united projection angle of the lamp image units I1 and I2 that passing through the angle-enlarged module 200 can be enlarged to be 2θ, and the claimed scope is not limited in this respect.

Figure 3:
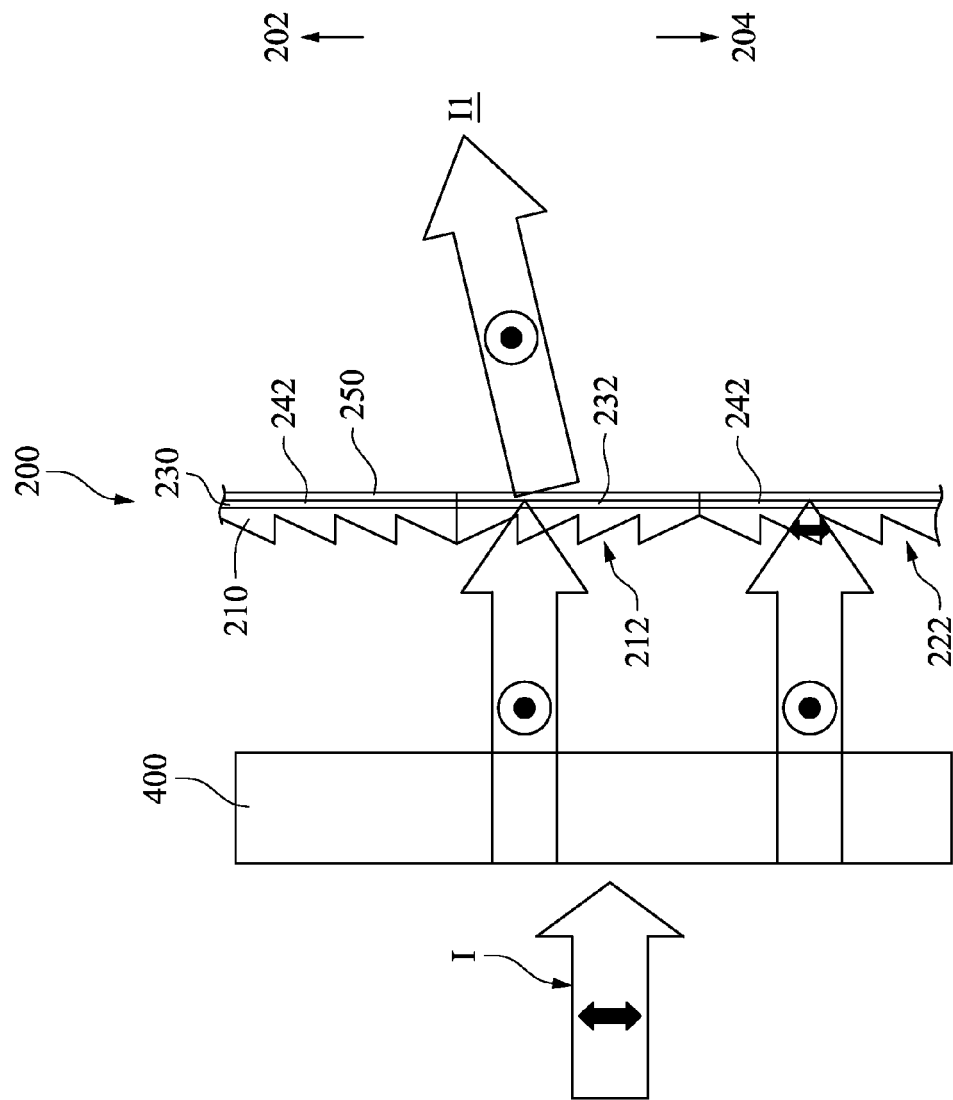
FIG. 3 is an optical schematic diagram of a polarization selector and the angle-enlarging module of FIG. 1 in the first time period.

Reference is made to FIG. 3 which is an optical schematic diagram of the polarization selector 400 and the angle-enlarging module 200 of FIG. 1 in the first time period. It is noted that for clarity, only portions of propagation paths of the lamp image unit I are shown in the FIG. 3. In this embodiment, the first polarization state can be a p-polarized state, and the second polarization state can be an s-polarized state. For clarity, p-polarized state in FIG. 3 is indicated with a marker ( ↕ ), and s-polarized state in FIG. 3 is indicated with a marker ( ). In this embodiment, the polarizer 250 allows the lamp image unit I with the second polarization state (i.e., s-polarized state) to pass therethrough, and blocks the lamp image unit I with the first polarization state (i.e., p-polarized state). Furthermore, the polarization selector 400 can be a liquid crystal panel. The liquid crystal panel converts the lamp image unit I with p-polarized state into the lamp image unit I with s-polarized state when the liquid crystal panel is in an on-state, such as applying voltage to the liquid crystal panel, and the lamp image unit I passes through the liquid crystal panel and maintains p-polarized state when the liquid crystal panel is in an off-state.

In the first time period, the polarization selector 400 is in the on-state, such that the lamp image unit I with p-polarized state passing through the polarization selector 400 is converted into s-polarized state. The lamp image unit I with s-polarized state enters the angle-enlarging module 200. A portion of the lamp image unit I impinges on the first deflecting area 212 of the deflecting plate 210, such that the portion of the lamp image unit I is deflected toward the first direction 202. The lamp image unit I deflected toward the first direction 202 then passes through the transmitting segment 232 of the wavelength retarder 230, maintains s-polarized state, passes through the polarization plate 250, and leaves the angle-enlarging module 200. Moreover, another portion of the lamp image unit I impinges on the second deflecting segment 222 of the deflecting plate 210, such that the portion of the lamp image unit I is deflected toward the second direction 204. The lamp image unit I deflected toward the second direction 204 then passes through the wavelength retarding segment 242 of the wavelength retarder 230, is converted into p-polarized state, and is blocked by the polarization plate 250. Accordingly, in the first time period, only the portion of lamp image unit I deflected toward the first direction 202 can leave the angle-enlarging module 200 and becomes the lamp image unit I1.

Reference is made to FIG. 4 which is an optical schematic diagram of the polarization selector 400 and the angle-enlarging module 200 of FIG. 1 in the second time period. It is noted that for clarity, only portions of propagation paths of the lamp image unit I are shown in the FIG. 4. In the second time period, the polarization selector 400 is in the off-state, such that the lamp image unit I with p-polarized state passes through the polarization selector 400 and maintains p-polarized state. The lamp image unit I with p-polarized state enters the angle-enlarging module 200. A portion of the lamp image unit I impinges on the first deflecting area 212 of the deflecting plate 210, such that the portion of the lamp image unit I is deflected toward the first direction 202. The lamp image unit I deflected toward the first direction 202 then passes through the transmitting segment 232 of the wavelength retarder 230, maintains p-polarized state, and is blocked by the polarization plate 250. Moreover, another portion of the lamp image unit I impinges on the second deflecting segment 222 of the deflecting plate 210, such that the portion of the lamp image unit I is deflected toward the second direction 204. The lamp image unit I deflected toward the second direction 204 then passes through the wavelength retarding segment 242 of the wavelength retarder 230, is converted into s-polarized state, passes through the polarization plate 250, and leaves the angle-enlarging module 200. Accordingly, in the second time period, only the portion of lamp image unit I deflected toward the second direction 204 can leave the angle-enlarging module 200 and becomes the lamp image unit I2. Subsequently, the angle can be enlarged as long as switching the first time period and the second time period in sequence.

It is noted that even though the lamp image unit I with p-polarized state is used as an example in this embodiment, the lamp image unit I can have s-polarized state in other embodiments. Moreover, in other embodiments, the polarizer 250 can allow the lamp image unit I with the first polarization state (i.e., p-polarized state) to pass therethrough, and block the lamp image unit I with the second polarization state (i.e., s-polarized state). Basically, an embodiment falls within the claimed scope of the invention if the lamp image unit I can be deflected to one direction in one time period, and can be deflected to another direction in another time period.

Reference is made again to FIG. 1. The lamp image units I1 and I2 that leave the angle-enlarging module 200 then enter the screen 300. In this embodiment, the screen 300 includes a first lens array 310 and a second lens array 320. The first lens array 310 is disposed facing the angle-enlarging module 200, and is disposed between the angle-enlarging module 200 and the second lens array 320. The lamp image cofocal plane 302 of the screen 300 is disposed between the first lens array 310 and the second lens array 320. The lamp image cofocal plane 302 can be a cofocal plane of the first lens array 310 and the second lens array 320.

The lamp image units I1 and I2, which have the projection angle 2θ together, are incident the screen 300 from the first lens array 310, and image on the lamp image cofocal plane 302. Since the united projection angle of the lamp image units I1 and I2 is twice the projection angle of the lamp image unit I, the Airy disk can be avoided on the lamp image cofocal plane 302. Moreover, due to the angle-enlarging module 200, the total lamp-image number of the lamp image units I1 and I2 is twice the lamp-image number of the lamp image unit I. For example, the lamp image units I1 and I2 totally include 16 lamp images while the lamp image unit I includes 8 lamp images, such that the lamp image units I1 and I2 can generate multi-view autostereoscopic display. The lamp image units I1 and I2 on the lamp image cofocal surface 302 then pass through the second lens array 320, and the united projection angle 2θ of the lamp image units I1 and I2 can be enlarged to be a projection angle φ to become the observable angle of the autostereoscopic display device.

Figure 5:
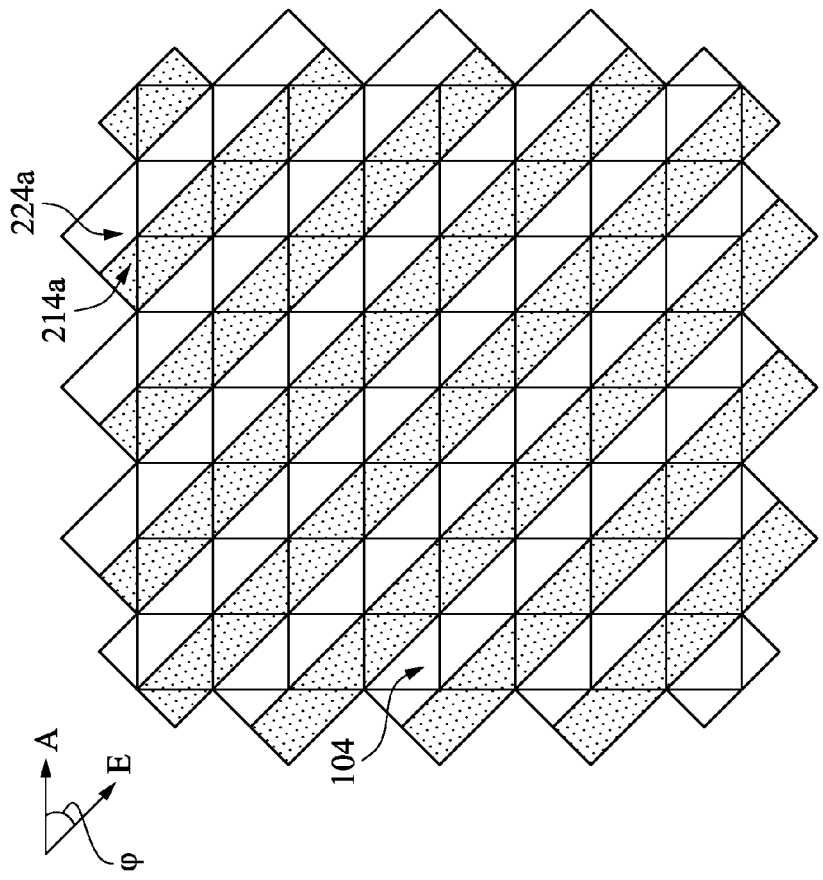
FIG. 5 is a front view of a surface of a first lens array of FIG. 1.

FIG. 5 is a front view of a surface 312 of the first lens array 310 of FIG. 1. Reference is made to FIGS. 1 and 5. In this embodiment, the first lens array 310 has the surface 312 away from the second lens array 320. The lamp image unit I1 or I2 forms a plurality of pixels 104 on the surface 312. Each of the pixels 104 overlap at least a portion of a projection 214a of the first deflecting segment 212 (see FIG. 2) on the surface 312 and at least a portion of a projection 224a of the second deflecting segment 222 (see FIG. 2) on the surface 312. That is, for each of the pixels 104, half of the light beam of the pixel 104 is deflected toward the first direction 202 in the first time period and becomes the lamp image unit I1, and another half of the light beam of the pixel 104 is deflected toward the second direction 204 in the second time period and becomes the lamp image unit I2. Therefore, the light beam of each of the pixels 104 can be uniformly deflected toward the first direction 202 and the second direction 204.

Reference is made to FIGS. 2 and 5. In one or more embodiments, the pixels 104 are arranged at least along an arrangement direction A. Each of the projections 214a and 224a of the first deflecting segment 212 and the second deflecting segment 222 of the deflecting plate 210 on the surface 312 have an extending direction E. The extending direction E and the arrangement direction A form an angle φ about 45 degrees. Accordingly, both of the first deflecting elements 214 and the second deflecting elements 224 can be manufactured along the extending direction E, which can simplify the manufacturing process. Moreover, each of the pixels 104 overlaps a portion of the projection 214a of the first deflecting segment 212 and a portion of the projection 224a of the second deflecting segment 222 along the arrangement direction A, which has the same direction as the first direction 202 or the second direction 204. Hence, the pixels 104 can be deflected toward the first direction 202 and the second direction 204 uniformly to reduce the property of improper quality, which is undivided-view, of the lamp images.

Figure 6:
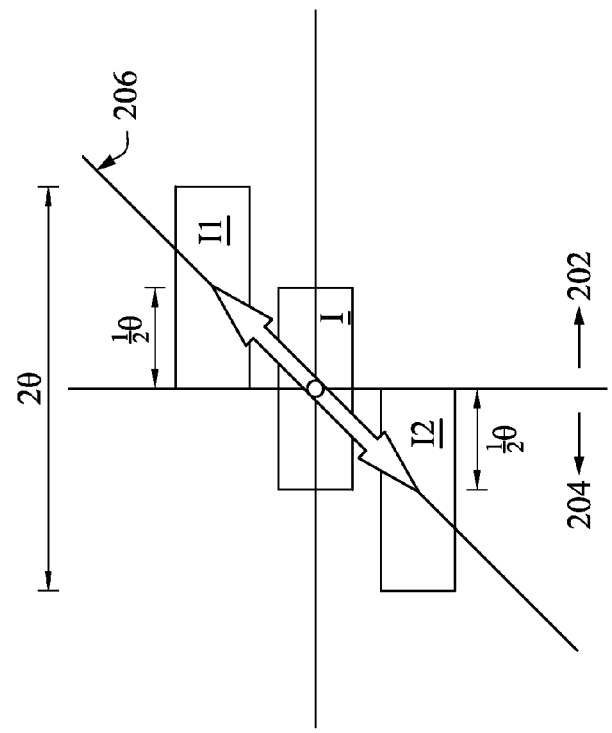
FIG. 6 is a front view of the angle-enlarging module of FIG. 1.

Reference is made to FIG. 6 which is a front view of the angle-enlarging module 200 of FIG. 1. The configuration in FIG. 5 is applied to the angle-enlarging module 200 in FIG. 6. That is, the extending direction E and the arrangement direction A are interlaced at the angle φ about 45 degrees as shown in FIG. 5. Taking the position of the lamp image unit I before passing through the angle-enlarging module 200 as a reference, the lamp image unit I1 shifts along an axis 206. In other words, the lamp image unit I1 shifts $(1/2)\theta$ along the first direction 202 and also shifts upward. Moreover, the lamp image unit I2 also shifts along the axis 206. In other words, the lamp image unit I2 shifts $(1/2)\theta$ along the second direction 204 and also shifts downward. Accordingly, the lamp image units I1 and I2 together form a lamp image unit with a projection angle $2\theta$. Although the lamp image units I1 and I2 respectively shift upward and downward, a diffuser can be included at the lamp image cofocal plane 302 of the screen 300 (see FIG. 1) to average the upward and downward direction shifts of the lamp image units I1 and I2.

Figure 7:
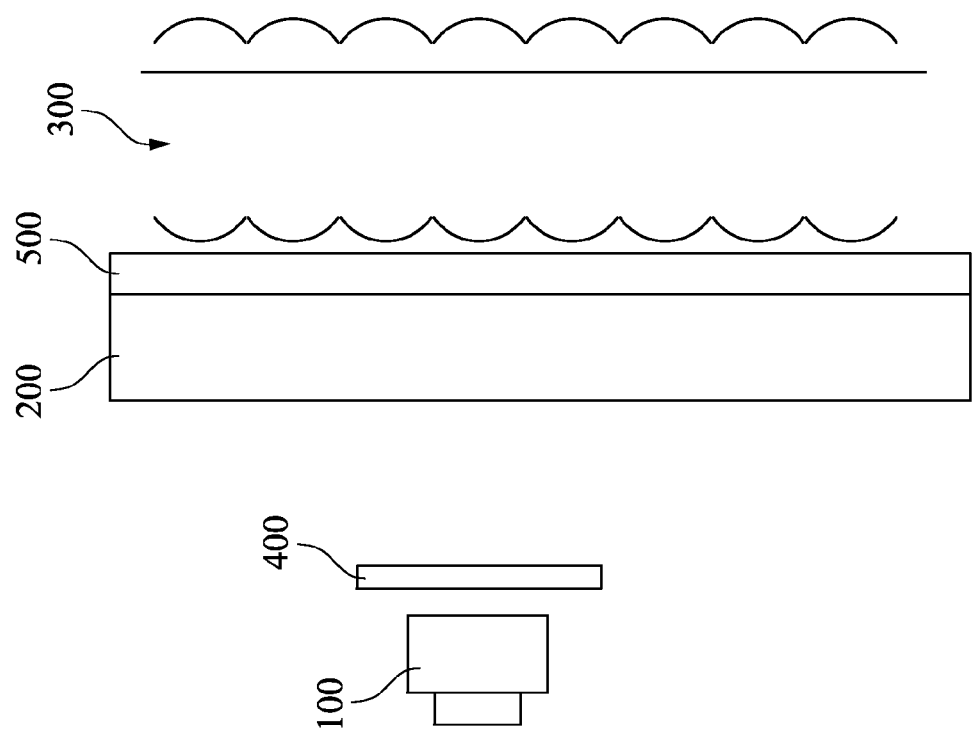
FIG. 7 is a schematic diagram of an autostereoscopic display device according to another embodiment of the present invention.

Reference is made to FIG. 7 which is a schematic diagram of an autostereoscopic display device according to another embodiment of the present invention. The difference between the present embodiment and the embodiment of FIG. 1 pertains to the presence of a collimating lens 500. In this embodiment, the autostereoscopic display device can further include the collimating lens 500 disposed between the angle-enlarging module 200 and the screen 300. The collimating lens 500 converts a point light source, i.e., the projector 100, into a plane light source, such that the lamp image units I1 and I2 (see FIG. 1) passing through the collimating lens 500 can uniformly impinge on the overall screen 300. Moreover, the collimating lens 500 can be a Fresnel lens, which has a patterned surface facing the screen 300. Hence, in one or more embodiments, the angle-enlarging module 200 can be fixed on a non-patterned surface of the Fresnel lens, and the claimed scope of the present invention is not limited in this respect. Other relevant structural details of the present embodiment are all the same as the embodiment of FIG. 1, and, therefore, a description in this regard will not be repeated hereinafter.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An autostereoscopic display device, comprising:
    at least one projector configured to provide a lamp image unit with a first polarization state;
    an angle-enlarging module comprising:
        a deflecting plate having at least one first deflecting segment and at least one second deflecting segment alternately disposed with each other, the first deflecting segment being configured to deflect the lamp image unit to a first direction, and the second deflecting segment being configured to deflect the lamp image unit to a second direction, wherein the first direction is different from the second direction;
        a wavelength retarder having at least one transmitting segment and at least one wavelength retarding segment, the transmitting segment being aligned to the first deflecting segment, and the wavelength retarding segment being aligned to the second deflecting segment, wherein the transmitting segment allows the lamp image unit to pass therethrough and maintains the first polarization state, and the wavelength retarding segment converts the first polarization state of the lamp image unit into a second polarization state; and
        a polarizer, the wavelength retarder being disposed between the deflecting plate and the polarizer;
    a screen, the angle-enlarging module being disposed between the projector and the screen; and
    a polarization selector disposed between the projector and the angle-enlarging module, wherein in a first time period, the polarization selector converts the first polarization state of the lamp image unit into the second polarization state, the lamp image unit then passes through the angle-enlarging module, is deflected to the first direction, and is incident the screen, in a second time period, the lamp image unit maintains the first polarization state after passing through the polarization selector, the lamp image unit then enters the angle-enlarging module, is deflected to the second direction by the angle-enlarging module, and is incident the screen.

2. The autostereoscopic display device of claim 1, wherein the deflecting plate comprises a plurality of first deflecting elements and a plurality of second deflecting elements, the first deflecting elements are disposed in the first deflecting segment, and the second deflecting elements are disposed in the second deflecting segment, wherein each of the first deflecting elements has a first light incident surface, and each of the second deflecting elements has a second light incident surface different from the first light incident surface.

3. The autostereoscopic display device of claim 2, wherein the deflecting plate has a normal surface passing between the first deflecting segment and the second deflecting segment adjacent to each other, the first light incident surfaces and the second light incident surfaces are symmetric with respect to the normal surface.

4. The autostereoscopic display device of claim 2, wherein cross-sectional surfaces of the first deflecting elements and cross-sectional surfaces of the second deflecting elements are zigzag-shaped.

5. The autostereoscopic display device of claim 1, wherein the polarizer allows the lamp image unit with the second polarization state to pass therethrough, and blocks the lamp image unit with the first polarization state.

6. The autostereoscopic display device of claim 1, wherein the screen comprises a first lens array and a second lens array, wherein the first lens array has a surface away from the second lens array, the lamp image unit forms a plurality of pixels on the surface, and each of the pixels overlap at least a portion of a projection of the first deflecting segment on the surface and at least a portion of a projection of the second deflecting segment on the surface.

7. The autostereoscopic display device of claim 6, wherein the pixels are arranged at least along an arrangement direction, wherein each of the projection of the first deflecting segment of the deflecting plate on the surface and the projection of the second deflecting segment of the deflecting plate on the surface has an extending direction, and the extending direction and the arrangement direction form an angle about 45 degrees.

8. The autostereoscopic display device of claim 1, further comprising:
    a collimating lens disposed between the angle-enlarging module and the screen.

9. The autostereoscopic display device of claim 1, wherein the polarization selector is a liquid crystal panel.

10. The autostereoscopic display device of claim 1, wherein the screen comprises:
- a first lens array disposed facing the angle-enlarging module; and
- a second lens array, wherein the first lens array is disposed between the angle-enlarging module and the second lens array.

* * * * *